C. H. RENO.
DEVICE FOR HEATING TIRES.
No. 69,367. Patented Oct. 1, 1867.
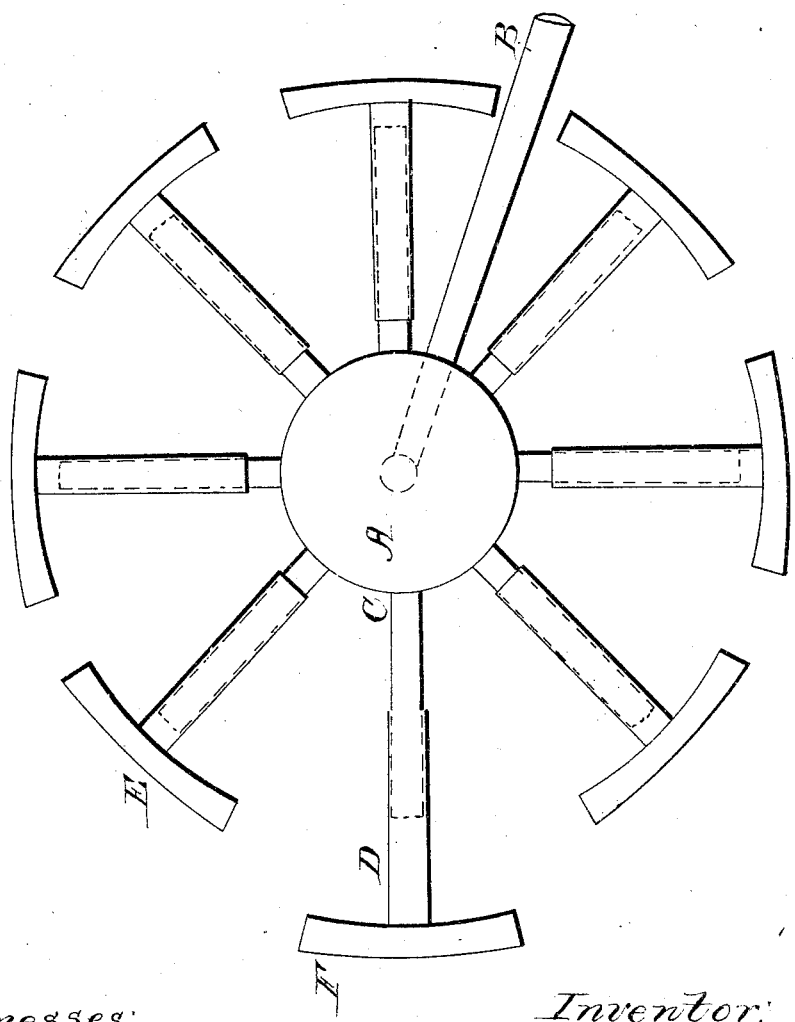
Witnesses:
John L. Lewis
Chas Ketchum
Inventor:
Charles H Reno

United States Patent Office.

CHARLES H. RENO, OF BARRINGTON, NEW YORK.

Letters Patent No. 69,367, dated October 1, 1867.

IMPROVED DEVICE FOR HEATING TIRES.

*The Schedule referred to in these Letters Patent and making part of the same.*

TO ALL WHOM IT MAY CONCERN:

Be it known that I, CHARLES H. RENO, of Barrington in the county of Yates, and State of New York, have invented a new and useful Improvement for Heating Tires; and I do hereby declare that the following is a full, clear, and exact description of the construction and operation of the same, reference being had to the annexed drawing, making a part of this specification, in which the figure is a bird's-eye view of the whole.

The nature of my invention consists in making a blast pipe or tuyere that will blow a fire when made in a circle, as is required for heating tire of any size, and it may be used by being placed upon the ordinary smith's forge, and may be connected to the bellows that is used at the same forge, or in any other way or manner desired.

To enable others skilled in the art to make and use my invention, I will proceed to describe its mode of construction and operation.

A is an air-chamber. Its size or shape may be varied to suit the conditions in which it may be used. At the under side is a hole for the introduction of the induction air pipe, and it is at the periphery provided with a series of holes for introducing the eduction air pipes, or the air-chamber and pipes C may all be made of cast metal and all cast together. B is the induction air pipe. It may be made in any ordinary manner, and may be shaped to suit the place where it is to be used. The eduction end must be inserted into the air-chamber A, and the other end must be connected with the bellows or fan-blower. C is one of a series of air pipes that extend radially from the air-chamber A. They may be made of tubes and be inserted into the air-chamber, or, if cast, may be cast with the chamber. The outer surface must be made smooth, so that the tube D may slide freely over them. Any required number of these pipes may be used. D is one of a series of pipes that are fitted to slide upon the pipes C, for the purpose of increasing or diminishing the blast circle, so that a fire may be blown when made over large or small tire. E is one of a series of branch or cross pipes. They are attached to or made with the pipes D. They may be made straight, or in the segment of a circle, and have their ends terminate in a flattened nozzle of any size required. F represents one of these pipes drawn out to a larger circle, and thus all of the pipes may be drawn out to make the fire for any size of tire, or a part of them may be not so far out, so that two sizes of tire may be heated at the same time.

The tire must be placed over the nozzles as near as convenient, and be supported by bricks, or any other kind of support that will not be consumed. The coal is then placed over the tire in sufficient quantity to cover the tire; it is then ignited, and a blast of air is applied, and in a short space of time the tire will be sufficiently heated. When one set of tire is removed another set may be laid on the same fire. The nozzles will discharge the air into the fire, and by coming in contact with the coal will be diffused throughout the entire mass of coal. The coal may be upon the branch pipes E without doing any damage, because the cold air passing through them will prevent them being burned.

Having thus fully described my invention, what I claim as new, and desire to secure by Letters Patent, is—

The chamber A, pipes C and D, and branch pipe E, when made and used as and for the purpose herein specified.

CHARLES H. RENO.

Witnesses:
  JOHN L. LEWIS,
  CHARLES R. KETCHUM.